Nov. 14, 1933.  A. W REYNOLDS  1,935,416
HARROW
Filed Sept. 9, 1932  2 Sheets-Sheet 1
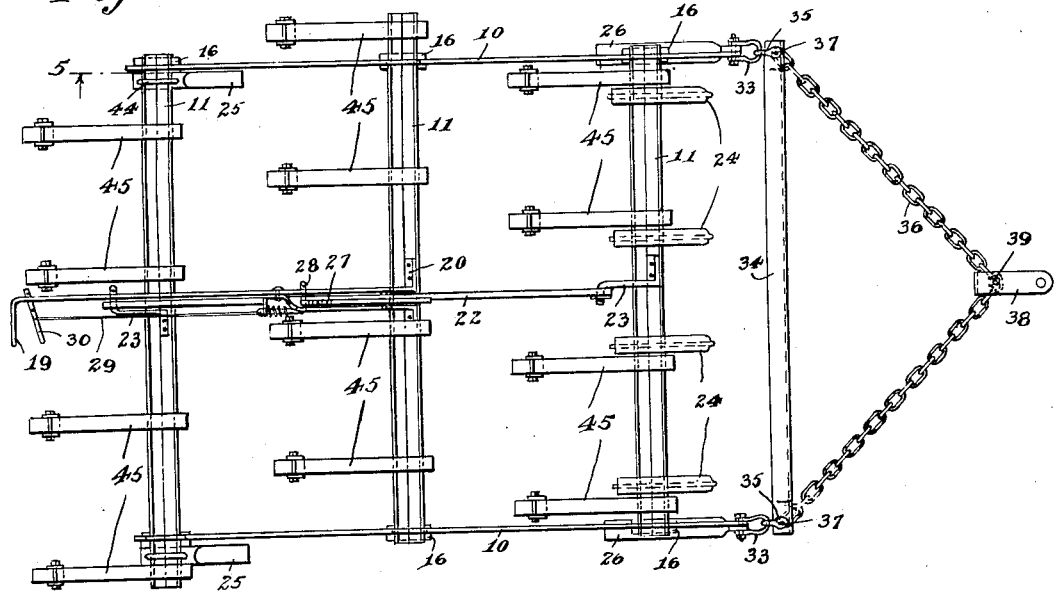
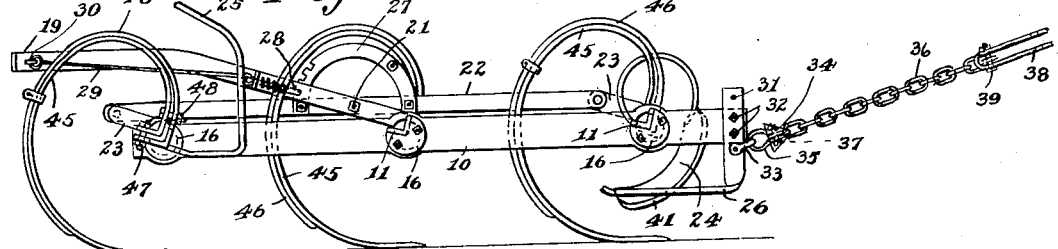
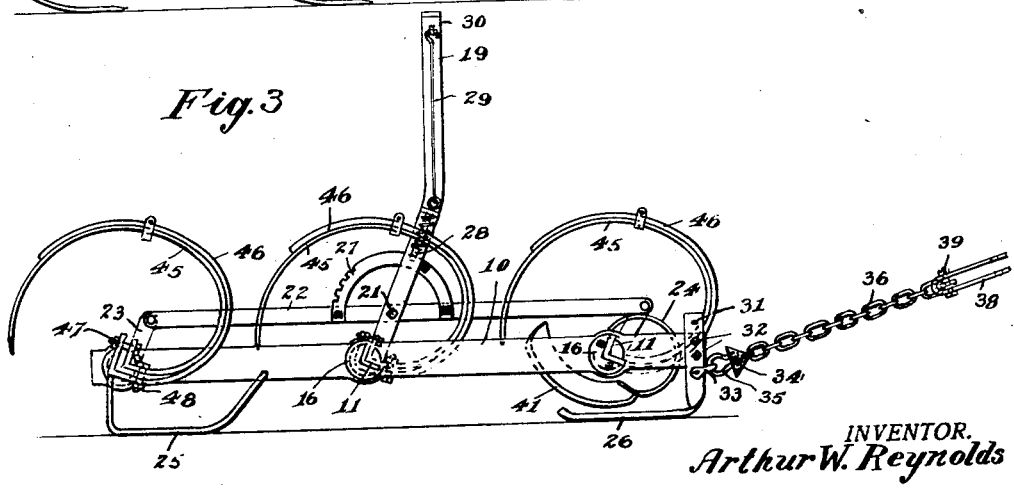
INVENTOR.
Arthur W. Reynolds
BY
Christian M. Newman
ATTORNEY Nov. 14, 1933.  A. W. REYNOLDS  1,935,416
HARROW
Filed Sept. 9, 1932   2 Sheets-Sheet 2
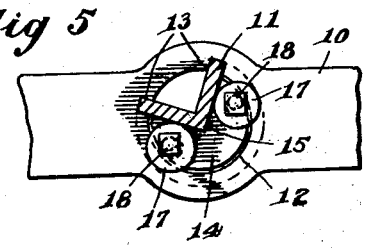
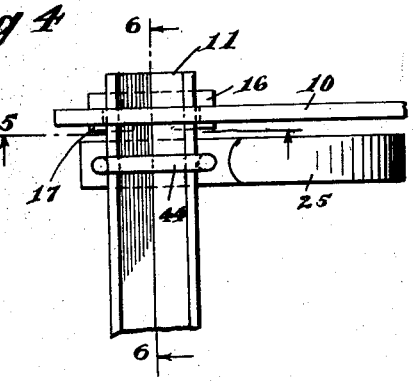
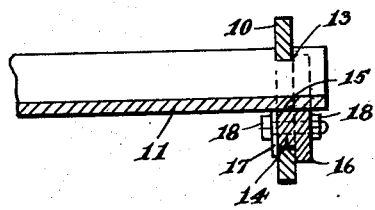
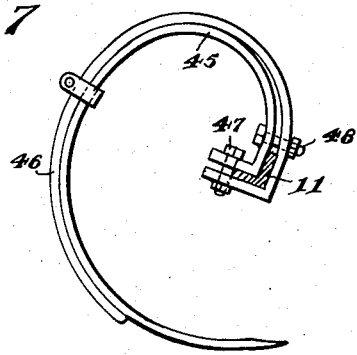
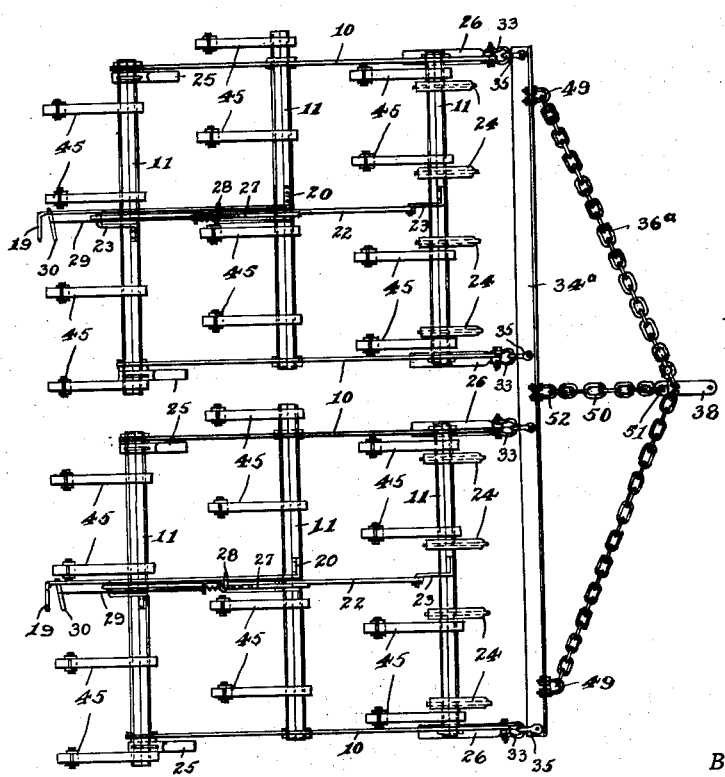
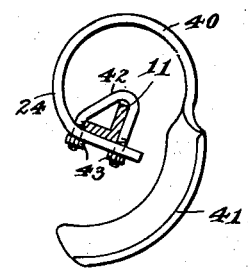
INVENTOR.
Arthur W. Reynolds
BY
Christian M Newman
ATTORNEY Patented Nov. 14, 1933

1,935,416

UNITED STATES PATENT OFFICE 1,935,416

HARROW

Arthur W. Reynolds, Newtown, Conn.

Application September 9, 1932. Serial No. 632,322

7 Claims. (Cl. 55—104)

My invention relates to improvements in harrows, and equivalent agricultural implements such as cultivators, weeders, and the like.

The object of the invention is to provide a heavy duty implement that is adapted to heavy, as well as light, work, and which may be used singly or in series, as may be desired.

The harrow is further and especially designed and adapted for deep cultivation, its teeth being reinforced and otherwise strongly constructed and securely clamped to the tooth bars. The teeth are so spaced and arranged with respect to one another on the several tooth bars as to insure a straight drag of the harrow behind a tractor, when attached thereto.

The teeth are also so arranged with respect to each other that when two or more harrows or sections are assembled, to be drawn together, the teeth of the several sections will still be in alignment one with the other and the adjacent teeth of the associated harrows will be approximately the same distance apart as the several teeth in the respective sections.

The harrow further includes side-frame members that are formed of a single piece, and that are suitably punched and swelled out, to form a relatively large round hole to receive and form a bearing for the ends of the tooth bars.

The harrow is further provided with four shoes, the two forward ones of which are adjustably secured to the side-bars and the rear one to the tooth bars so as to support the harrow when the teeth are raised, as in travelling over the road. Another and important feature of the invention is the provision of knives which are mounted upon the front tooth bar, intermediate the teeth, to provide means for cutting the weeds or other trash into relatively short lengths, and in a way to allow them to move back between the teeth and not choke up the same. These knives are mounted upon the front tooth bar and adapted to be turned with the bar and teeth into and out of operative position, as occasion may require.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a top plan view of my improved harrow, the lever and teeth being in a lowered position and set for harrowing;

Fig. 2 is a side elevation of the harrow, as shown in Fig. 1;

Fig. 3 is a further side elevation of the harrow shown in Figs. 1 and 2, but with the teeth and cutters raised in a manner to permit the harrow to be dragged over a road;

Fig. 4 shows an enlarged detail plan view of the upper left hand corner portion of the harrow, as shown in Fig. 1;

Fig. 5 is an enlarged sectional elevation taken on line 5 of Figs. 1 and 4;

Fig. 6 is a further sectional view taken on line 6—6 of Fig. 4;

Fig. 7 is an enlarged detail side elevation of one of the harrow teeth mounted on one of the angle iron tooth bars;

Fig. 8 is a similar detail side elevation of one of the cutters mounted on the front tooth bar, in position shown in Fig. 2; and Fig. 9 shows a pair of my improved harrows connected by a single draw-bar, forming a single hitch for two sections.

The harrow, as will be seen, is designed to be constructed of commercial steel, as for instance the two side-bars 10—10 are formed of straight flat metal strips while the tooth bars, as well as the draw bar, are formed of angle pieces. The teeth and the knife members are likewise formed of commercial sizes of steel and are adapted to be quickly attached and detached to the tooth bars, as occasion may require.

The tooth bars which form cross members of the harrow are more or less flexibly connected to the side-bars, thereby insuring a flexible harrow construction that is well adapted to travel over uneven ground and accommodate itself to stones or other obstructions that may be engaged. The three angle-shaped tooth bars 11 are substantially alike in construction, except that the middle and rear bars are slightly longer than the front bar, the first mentioned extending slightly out beyond one of the side-bars and the rear tooth bar extending out slightly on the outer side of the other side-bar. This obviously enables me to carry out the staggered relation of the teeth so that all the teeth of the front bar will be positioned within the frame structure, whereas the teeth of the middle bar are positioned to the one side and the teeth of the rear bar positioned to the other side of the frame structure in a manner to insure a straight drag of the harrow.

As a convenient and practical method of flexibly mounting the angle-iron tooth bars 11 in the round holes or bearings 12 of the side-bars, and to form suitable bearings in said side-bars which will permit the tooth bars to rock therein I first form properly located holes in the side bars, and then enlarge the holes by spreading the stock of the bar to opposite sides, by a punch or other suitable means, in a manner to form enlarged round holes suitable to receive the ends of the tooth bars. I next provide notches 13, see Fig. 6, in the edges of the end portions of the tooth bars to receive the inner annular edge of the side-bars surrounding the holes 12. In this connection, it will be understood that when assembling the tooth bars, and side-bars, the tooth bars are first inserted in the holes 12 and then lifted up so that the notches 13 of the tooth bars will receive the annular edge of the side-bars surrounding the holes 12, and then place in the opening beneath the tooth bar a flanged disk 14 that is provided with a V-shaped notch 15 to receive the back or underside of the tooth bar in a manner to support and form an attached circular bearing for the said tooth bar in a manner to permit it to rotate in and with respect to the hole 12 in the side-bar.

This disk 14 includes a flange 16 that engages the outer face of the side-bar and holds against inward movement while the washers 17 and bolts 18 secured to the disk support the same against outward movement, thereby forming a simple and desirable flexible assemblage which allows the tooth bars and their disks to be readily rocked through the action of the hand lever 19 connected therewith.

This lever 19 is secured to the middle tooth bar 11, as at 20, and is pivotally connected, as at 21, to a link 22, the forward and rear ends of which link are hingedly connected to arms 23 of the rear and front tooth bars. By this means it will be seen that with the raising of the lever from the position shown in Fig. 2 to that shown in Fig. 3, all three of the toothed bars will be rocked and their teeth, as well as the trash cutters 24 on the front bar 11, raised above the shoes 25 and 26, the former of which is secured to the rear tooth bar to be turned therewith, whereas the latter is secured to the forward end of the side-bars.

As a means of holding the hand lever 19 in its lowered position shown in Fig. 2, I attach a notched sector 27 to the link 22 and mount a spring-actuated pawl 28 on the lever 19 and connect the pawl by rod 29 with a trigger 30 carried upon the outer end of the lever adjacent to the handle.

The forward shoe 26 includes a vertical portion for attachment to the side bars, and a horizontal runner portion. The vertical portion includes a series of holes 31 that are adapted to register with like holes in the forward end of the side-bar so that the shoes can be adjustably attached to the side-bars by means of bolts 32, and whereby the runner portion may be positioned different distances below the side-bars in a way to regulate the depth of cultivation by the teeth. A clevis 33 is attached, as by means of bolts, to the vertical portion of each shoe 26 for the connection of the draw-bar 34 whose flattened end portions are also provided with a clevis 35 that is looped through the first mentioned clevis. A single chain 36 has its two end portions connected to opposite ends of the draw-bar, as by means of a bolt 37 that also serves for the connection of the clevis 35. The chain 36 is threaded through a clevis 38 that is secured thereto by means of a bolt 39. This last mentioned clevis is obviously adapted to be attached to a draw-bar or other member of a tractor.

The trash cutters 24, of which four are shown in Fig. 1, attached to the front tooth bar 11 of the harrow, are preferably of the shape shown in the several figures and each includes a yieldable upper bowed spring portion 40, see Fig. 8, and has the front edge 41 of its blade portion sharpened so that as it is dragged along the surface of the ground between the harrow teeth, as designated in Figs. 1 and 2, it will cut weeds and other trash in sufficiently relatively short lengths to permit them to pass through the teeth of the harrow. The shank portion of this cutter is provided with suitably spaced holes to receive the threaded end portions of a specially shaped short yoke 42 that engages the tooth bar and whereby the teeth are clamped thereto, with the tightening of the nuts 43 mounted on the threaded ends of said yoke.

The rear shoes are also secured to their tooth bar, see Figs. 1 and 4, by means of a yoke 44 that extends over the tooth bar, and have their two end portions threaded and passed through holes in the shoe, and secured by means of nuts in the same manner as that indicated in Fig. 8 for the attachment of the cutter to the tooth bar.

The harrow teeth 45 heretofore referred to, see Fig. 7, include an inner and relatively long spring tooth member, and an outer and somewhat similarly shaped stiffening member 46 that is positioned against and around the back of the longer member. The shank or attached end portions of these two members 45 and 46 each include a right angle bend, one member to fit the inner face of the tooth bar and the other to fit the outer face of the bar. They also are provided with aligned holes through which bolts 47 and 48 are positioned. The bolt 47 is preferably in engagement with one edge of the toothed bar, whereas the other is in spaced relation to the other edge, better to permit the two sections of the tooth to be firmly clamped to the tooth bar.

In Fig. 9 I have shown two harrows operatively connected, side by side, to a single draw bar 34ª which obviously serves to properly space and align the harrows and afford a single draft means such as that shown, including a chain 36ª, the opposite ends of which are connected to a U-bolt 49 secured to opposite end portions of the draw bar 34ª. This chain 36ª, like the chain 36 shown in the other assemblies, is threaded through the clevis 38. One end of an additional short length of chain 50 is secured to the clevis 38, as at 51, while the other end is connected to a U-bolt 52 secured to the draw bar 34ª. These three chain connections with the draw bar insure an even pull and distribution of the load, when drawn by means of the clevis 38, as shown in this figure.

Having thus described my invention, what I claim and desire to secure by Letters Patent is:

1. A harrow of the class described comprising a pair of side-bars having aligned holes therein forming bearings, tooth bars having their end portions rotatably mounted with respect to the side-bars, a series of teeth mounted on each tooth bar, the teeth of the front tooth bar being equally positioned on each side of and with respect to the center of the draft line of the harrow, while the teeth of the intermediate and rear tooth bars are in staggered relation to each other and the teeth of the front bar, shoes adjustably mounted on each side-bar and the rear tooth bar, lever means to simultaneously turn all the tooth bars and to raise and lower the teeth and shoes mounted thereon, and a draw bar connected with the side-bars for pulling the harrow.

2. A harrow of the class described comprising a pair of side-bars having aligned holes therein forming bearings, tooth bars having their end portions rotatably mounted with respect to the side-bars, a series of teeth mounted on each tooth bar, the teeth of the front tooth bar being equally positioned on each side of and with respect to the center of the draft line of the harrow, while the teeth of the intermediate and rear tooth bars are in staggered relation to each other and the teeth of the front bar, cutter knives mounted on a tooth bar intermediate the teeth, shoes adjustably mounted on each side-bar and the rear tooth bar, lever means to simultaneously turn all the tooth bars and to raise and lower the teeth, knives and shoes mounted thereon, and a draw bar connected with the side-bars for pulling the harrow.

3. A harrow of the class described, comprising a pair of side-bars having aligned holes therein forming bearings, a disk-like member rotatably mounted in each hole and having a notch formed in its edge portion, angle tooth bars having their end portions supported in the notches of the rotatable disks and adapted to turn therewith in the holes of the side-bars, a series of teeth mounted on each tooth bar, a series of cutters mounted on one of the tooth bars intermediate the teeth, shoes adjustably mounted on the forward end of each of the side-bars, shoes mounted on the rear tooth bar, lever means to rock the tooth bars in a manner to raise and lower the teeth, knives and shoes, and a draw bar connected with the side-bars for pulling the harrow.

4. A harrow of the class described comprising a pair of side-bars having aligned holes therein forming bearings, angle iron tooth bars having their end portions rotatably mounted in the holes of each side-bar, a series of teeth mounted on each tooth bar, the teeth of the front tooth bar all being positioned between the two side bars, one of the teeth in the series on the second tooth bar being positioned on the outside of one of the side bars, one of the teeth on the third tooth bar being positioned on the outer side of the other side-bar, shoes adjustably mounted on the forward end of each of the side-bars and shoes adjustably mounted on the rear tooth bar, lever means to rock all of the tooth bars simultaneously in a manner to raise and lower the teeth and shoes, and a draw bar connected with the side-bars, for pulling the harrow.

5. A harrow of the class described comprising a pair of side-bars having aligned holes therein forming bearings, angle tooth bars having their end portions supported and adapted to turn in the holes of the side-bars, a series of teeth mounted on each tooth bar, a shoe adjustably mounted on the forward end of each of the side-bars, a shoe mounted on each end portion of the rear tooth bar, lever means connected to rock the tooth bars in the side-bars in a way to raise and lower the teeth and shoes, and draw bar connections for pulling the harrow.

6. A harrow of the class described comprising a pair of side bars having aligned holes therein forming bearings, the stock of the side-bars above and below the holes being spread to form a widened bearing portion of the side-bar, a flanged disk having a V-shaped notch in one edge portion rotatably mounted in each hole, means for holding the disks in the holes in rotatable relation to the side-bars, an angle-iron tooth bar having its two end portions seated in the V-shaped notches of the disks, and having the two edges of said end portions notched to engage the annular edge portions of the holes formed in the bars to prevent lateral movement of the tooth bar.

7. A harrow of the class described including a frame, a series of tooth bars rockably mounted in the frame, teeth mounted on the bars, shoes secured to the forward end of the frame to support the same, other shoes mounted upon the rear rocker bar adapted to be raised and lowered with the teeth of the bar, and means for operating the rocker bars to raise and lower the teeth and shoes.

ARTHUR W. REYNOLDS.